(12) United States Patent
Ren et al.

(10) Patent No.: US 10,024,567 B2
(45) Date of Patent: Jul. 17, 2018

(54) INTELLIGENT CONTROL METHOD OF HVAC COMPUTER ROOM

(71) Applicant: Chunlei Ren, Hefei (CN)

(72) Inventors: Chunlei Ren, Hefei (CN); Hui Zeng, Hefei (CN)

( * ) Notice: Subject to any disclaimer, the term of this patent is extended or adjusted under 35 U.S.C. 154(b) by 26 days.

(21) Appl. No.: 15/256,705

(22) Filed: Sep. 5, 2016

(65) Prior Publication Data

US 2018/0031257 A1 Feb. 1, 2018

(30) Foreign Application Priority Data

Jul. 29, 2016 (CN) .......................... 2016 1 0613246

(51) Int. Cl.
*G06F 19/00* (2018.01)
*F24F 11/30* (2018.01)
*F24F 11/62* (2018.01)
*F24F 11/00* (2018.01)
*G05B 15/02* (2006.01)
*F24F 11/65* (2018.01)

(52) U.S. Cl.
CPC ............ *F24F 11/30* (2018.01); *F24F 11/006* (2013.01); *F24F 11/62* (2018.01); *G05B 15/02* (2013.01); *F24F 11/65* (2018.01); *F24F 2011/0064* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0145705 | A1* | 7/2005 | Shah | F24F 11/0086 236/51 |
| 2010/0076605 | A1* | 3/2010 | Harrod | F24F 11/0009 700/276 |
| 2010/0211224 | A1* | 8/2010 | Keeling | F24D 19/1066 700/277 |
| 2014/0175181 | A1* | 6/2014 | Warren | G05D 23/19 236/51 |

\* cited by examiner

*Primary Examiner* — Kidest Bahta
(74) *Attorney, Agent, or Firm* — Wayne & King LLC

(57) ABSTRACT

An intelligent control method of HVAC computer room is disclosed, including steps of: constructing an integrated central processing device, which controls start-stop operations of start-stop devices of each one of equipments, and controls each display unit to display parameters; displaying datas of a sensor unit; controlling the whole system's start-stop operation and the operation of a system protective module, via an one key type start-stop device, and controlling the integrated central processing device through a remote control module. The method in disclosure possesses functions of start-stop with one key, remote control, automatic operation of devices, unmanned operation, and functions of remote checking on operation states, system protection and operation state informations.

5 Claims, 1 Drawing Sheet

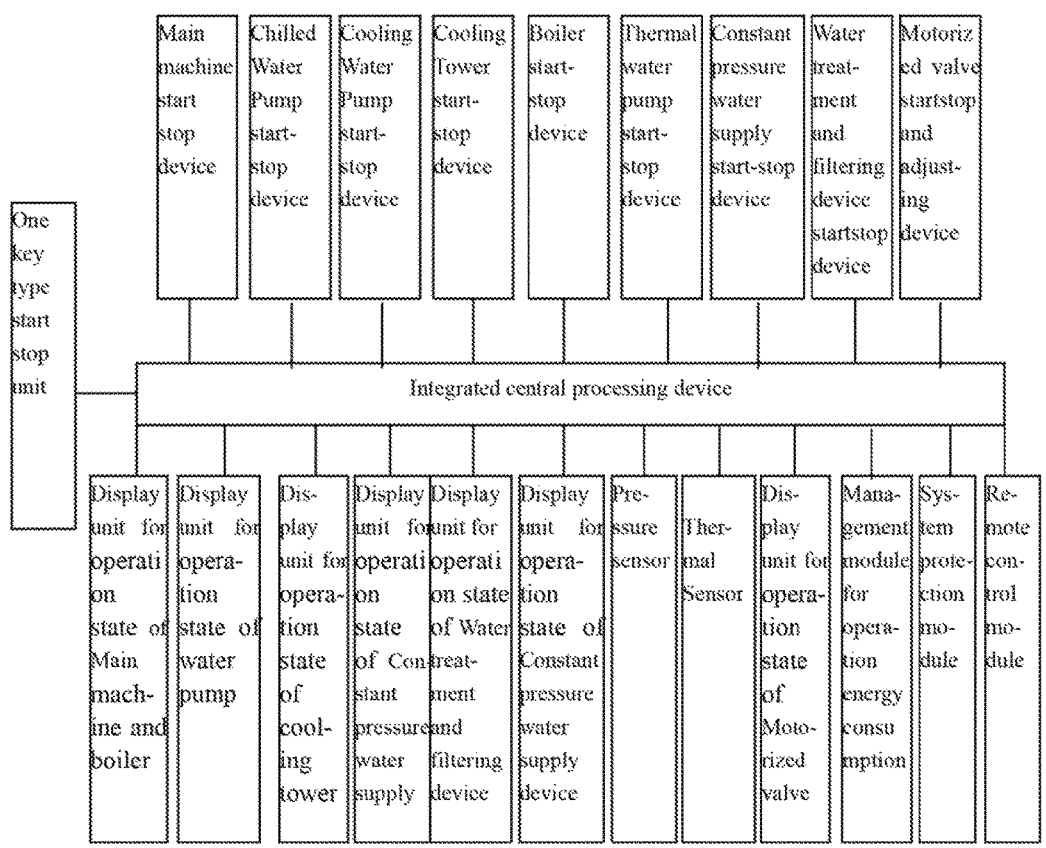

INTELLIGENT CONTROL METHOD OF HVAC COMPUTER ROOM

CROSS-REFERENCE TO RELATED APPLICATIONS

This application claims priority benefit of Chinese Patent Application No. 201610613246.5 with a filing date of Jul. 29, 2016. The content of the aforementioned application, including any intervening amendments thereto, are incorporated herein by reference.

TECHNICAL FIELD

This invention relates to a technical field of controlling methods of HVAC (Heating, Ventilating and Air Conditioning) computing rooms, and specifically relates to an intelligent control method of a HVAC computer room.

BACKGROUND OF THE PRESENT INVENTION

An electric control system for the HVAC computing room generally aims to monitor and manage all equipments and operation states of the computing room in a centralized way. Those equipments to be monitored and managed constitute subsystems of the computing room, including a main machine operation system, a cooling tower operation system, a thermal water boiler system, a constant pressure water supply system, a water filtering and treatment system, motorized valve system, and a deoxidizing device system. In prior arts, the main machine of the air-conditioner is controlled by a separated control box, another separated control box is further provided for electrically controlling the chilled water pump, the cooling water pump and the thermal water pump, a further separated control box electrically controls the cooling tower, and the constant pressure water supply device, the water treatment device, and the motorized valve are respectively provided with an additional control box for electric control. All those control boxes are positioned close to related devices, or in a unified way according to customer demands. That may cause a large space occupation, and the electronic control boxes only realize the basic function of device control, but can achieve neither the function of operation state checking and monitor-displaying on each of the equipments, nor the function of control linkage or state checking. In addition, as the box is designed according to the power of the devices or according to different configurations of different manufacture, the control boxes have varying specifications, thus affecting the whole appearance of the computing room. Generally, the line arrangement of this HVAC computing room is realized by manual wiring in a field-bus way, which leads to a high technical requirement on field workers. This kind of field arrangement not only causes materials waste, but also prolongs the arrangement period of the computing room.

SUMMARY OF PRESENT INVENTION

Aimed at the aforementioned disadvantages in the prior art, an object of the disclosure is to provide an intelligent control method of HVAC computing room.

To obtain the object, the technical solution in the present disclosure is as follows:

In an embodiment of the invention, the intelligent control method of HVAC computing room, includes steps of:

constructing an integrated central processing device, which has a control connection separately with each one of equipments in the computing room, wherein the integrated central processing device controls start-stop operations of each one of the equipments;

forming a signal connection between the integrated central processing device and display units of each one of the equipments separately, so that the integrated central processing device can control each one of the display units to display parameters;

separately connecting the integrated central processing device with a sensor unit in the HVAC computing room through a connection mode of signals, so that the integrated central processing device receives datas collected from the sensor unit and further control to display the datas;

creating a control connection between the integrated central processing device and a one key type start-stop device in the HVAC computing room, so that the integrated central processing device can operate start-stop actions according to a predefined device start-stop order;

connecting the integrated central processing device with a system protection module in a controlling mode, so that the integrated central processing device can control operations of the system protection module;

and connecting the integrated central processing device with a remote control module in a connection mode of signals, so that a remote control on the integrated central processing device can be achieved through the remote control module.

Further, in the intelligent control method of HVAC computing room, the integrated central processing device is also connected with a management module for operation energy consumption through signals in the HVAC computing room, and parameters of the management module for operation energy consumption is controlled to be displayed through the integrated central processing device.

Moreover, in the intelligent control method of HVAC computing room, when there exists multiple equipments of the same kind, the integrated central processing device can control start-stop operations of the equipments of the same kind according to an order of quantity and number.

Compared with the prior art, the present disclosure, following advantages are achieved.

According to the present disclosure, an electrical linkage is achieved among all electromechanical equipments, and the method in this disclosure possesses functions of start-stop with one key, remote control, automatic operation of devices, and unmanned operation, as well as functions of remote checking on operation states, system protection and operation state informations.

DESCRIPTION OF THE DRAWINGS

The above and other features of the present disclosure will now be described in detail with reference to a certain exemplary embodiment thereof illustrated the accompanying drawing which is given hereinafter by way of illustration only, and thus is not limitative of the present disclosure, and wherein:

FIG. 1 schematically shows the block diagram of the method according to a specific embodiment in this disclosure.

DETAILED DESCRIPTION OF PREFERRED EMBODIMENTS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to a certain embodiment of the present disclosure, examples of which are illustrated in the accompanying drawing and described below. While the invention will be described in conjunction with an exemplary embodiment, it will be understood that present description is not intended to limit the invention to the exemplary embodiment. On the contrary, the invention is intended to cover not only the exemplary embodiments, but also various alternatives, modifications, equivalents and other embodiments, which may be included within the spirit and scope of the invention as defined by the appended claims.

Hereinafter, the present disclosure will be described for those skilled in the art to easily achieve it.

As stated above, the present invention provides an intelligent control method of an HVAC computing room, including steps as follows.

An integrated central processing device is constructed to generate a control connection separately with each one of equipments in the computing room, wherein the integrated central processing device controls start-stop operations of each one of the equipments.

A signal connection is separately formed between the integrated central processing device and display units of each one of the equipments, so that the integrated central processing device can control each of the display units to display parameters.

The integrated central processing device is separately connected with a sensor unit in the HVAC computing room through a connection mode of signals, so as to receive datas collected from the sensor unit and further to control to display the datas.

A control connection is created between the integrated central processing device and a one key type start-stop device in the HVAC computing room, so that the integrated central processing device can operate start-stop actions according to a predefined device start-stop order.

The integrated central processing device is connected with a system protection module in a controlling mode, to control operations of the system protection module.

The integrated central processing device is connected with a remote control module in a connection mode of signals, so that a remote control on the integrated central processing device can be achieved through the remote control module.

Further, the integrated central processing device is also connected with a management module for operation energy consumption, through signals, and parameters of the management module for operation energy consumption is controlled to be displayed through the integrated central processing device.

When there exists multiple equipments of the same kind, the integrated central processing device can control the start-stop operations of the equipments of the same kind, according to an order of quantity and number.

Specific Embodiment

Referring to FIG. 1, an HVAC computing room includes an integrated central processing device, and a control connection is formed separately between the integrated central processing device and a main machine start-stop device, a chilled water pump start-stop device, a cooling water pump start-stop device, a cooling water pump start-stop device, a cooling tower start-stop device, a boiler start-stop device, a thermal water bump start-stop device, a constant pressure water supply start-stop device, a water treatment and filtering start-stop device, a motorized valve start-stop device, and a deoxidizing start-stop device, in the HVAC computing room. In this case, the integrated central processing device can control to operate the main machine start-stop device, the chilled water pump start-stop device, the chilled water pump start-stop device, the cooling water pump start-stop device, the cooling tower start-stop device, the boiler start-stop device, the thermal water bump start-stop device, the constant pressure water supply start-stop device, the water treatment and filtering start-stop device, the motorized valve start-stop device, and the deoxidizing start-stop device.

A signal connection is also formed between the integrated central processing device and a one key type start-stop unit, a display unit for operation state of a main machine and a boiler, a display unit for operation state of a water pump, a display unit for operation state of a cooling tower, a display unit for operation state of a constant pressure water supply, a display unit for operation state of a water treatment and filtering device, a display unit for operation state of a timing water supply device, a pressure sensor, a thermal sensor, a display unit for operation state of motorized vale, a management module for operation energy consumption, a system protection module, and a remote control module, separately through a signal line.

In the present disclosure, with the central processing device processing datas, the main machine start-stop device is provided with a main machine controlling function, to control the main machine to start and stop, especially according to the main machine's type, quantity and number respectively.

Further in this disclosure, with the central processing device processing datas, the chilled water pump start-stop device possesses a control function of starting and stopping a chilled water pump, according to the chilled water pump's quantity and number respectively.

In this invention, with the central processing device processing datas, the cooling water start-stop device functions to control the cooling water pump to start and stop, according to the cooling water pump's quantity and number respectively.

Accordingly, by way of processing dates by the central processing device, the cooling tower start-stop device in the disclosure is provided with a control function of starting and stopping the cooling tower, especially according to the cooling tower's quantity and number respectively.

Furthermore, with the central processing device processing datas, the boiler start-stop device functions to control the boiler to star and stop, according to the boiler's quantity and number respectively.

Accordingly, by processing dates through the central processing device, the thermal water pump start-stop device works for controlling the thermal water pump to start and stop, especially according to the thermal water pump's quantity and number separately.

By processing datas through the central processing device, the constant pressure water supply start-stop device works for controlling a constant pressure water supply device to start and stop, so as to achieve automatic water supplying.

Besides, by processing dates through the central processing device, the water treatment and filtering device start-stop device in this disclosure functions for controlling the water treatment and filtering equipment to start and stop, and further to automatically deal with blowdown situations according to the system cleanliness.

In this disclosure, by processing datas through the central processing device, the motorized valve start-stop device has a control function of starting and stopping the motorized valve as well as adjusting the openness of the motorized valve.

By processing datas through the central processing device, the deoxidizing start-stop device in this disclosure is provided with a control function of starting and stopping the deoxidizing device, further to perform deoxidation treatment.

In this disclosure, by processing dates through the central processing device, the one key type start-stop device controls the whole system to operate starting-stopping actions according to a predefined device start-stop order, so that the system can automatically start or stop, in an unmanned situation, thus achieving remote control. Besides, it is possible for the system to accomplish automatic water supply, deoxidation and blowdown.

By processing datas through the central processing device, the display unit for the operation state of main machine and boiler in the disclosure can display the operation states, parameters, and operation time records of the main machine and the boiler.

In the disclosure, by processing dates through the central processing device, the display unit for operation state of water pump (chilled water pump, cooling pump and thermal water pump), can display the operation states, parameters and operation time records of the water pump (chilled water pump, cooling pump and thermal water pump).

By processing datas through the central processing device, the display unit for the operation state of cooling tower in the disclosure can display the operation states, parameters, and operation time records of the cooling tower.

Further, by processing datas through the central processing device, the display unit for the operation state of constant pressure water supply in the disclosure can display the operation states, parameters, and operation time records of the constant pressure water supply device.

In this disclosure, by processing dates through the central processing device, the display unit for the operation state of water treatment and filtering device is controlled to display the operation states, parameters, and operation time records of the water treatment and filtering device.

By processing dates through the central processing device, the pressure sensor in this disclosure displays parameters of a pressure gage.

In this disclosure, by processing datas through the central processing device, the thermal sensor can display parameters of a thermometer.

By processing dates through the central processing device, the display unit for operation state of motorized valve in this disclosure shows the operation states, parameters, and operation time records of the motorized valve.

In the present disclosure, by processing datas through the central processing device, the management module for operation energy consumption functions to display operation time and electricity consumption of the device read by the management module, and may transfer the energy consumption datas, etc.

Moreover, by processing dates through the central processing device, the system protection module in this disclosure, can realize protection functions in situations of water shortage, device lacking, high and low voltage, and overheating, etc.

Besides, In the present disclosure, by processing datas through the central processing device, the remote control module can achieve long-distance control on a remote computer or cellphone through a wireless network or a radiophone card.

The invention has been described in detail with reference to preferred embodiment thereof. However, it will be appreciated by those skilled in the art that changes may be made in the embodiment without departing from the principles and spirit of the invention, the scope of which is defined in the appended claims and their equivalents.

We claim:

1. An intelligent control method of HVAC computing room, comprising:

constructing an integrated central processing device, which has a control connection with each one of equipment in the computing room separately, the integrated central processing device controlling start-stop operations of each one of the equipment;

forming a signal connection between the integrated central processing device and displaying units of each one of the equipment, so that the integrated central processing device can control each one of the display units to display parameters;

connecting the integrated central processing device separately with a sensor unit in the HVAC computing room through a connection mode of signals, so as to receive data collected from the sensor unit and further to control to display the data;

creating a control connection between the integrated central processing device and a one key type start-stop device in the HVAC computing room, the integrated central processing device controlling the one key type start-stop device to operate start-stop actions;

connecting the integrated central processing device with a system protection module in a controlling mode, to control operations of the system protection module;

connecting the integrated central processing device with a remote control module in a connection mode of signals, to achieve a remote control on the integrated central processing device through the remote control module;

wherein the equipment comprises a constant pressure water supply start-stop device, a water treatment and filtering start-stop device, and a deoxidizing start-stop device;

the constant pressure water supply start-stop device works for controlling a constant pressure water supply device to start and stop, to achieve automatic water supplying;

by processing data through the central processing device, the water treatment and filtering device start-stop device functions for controlling the water treatment and filtering equipment to start and stop, and further to automatically deal with blowdown situations according to the system cleanliness;

by processing data through the central processing device, the deoxidizing start-stop device is provided with a control function of starting and stopping the deoxidizing device, to perform deoxidation treatment.

2. The intelligent control method of HVAC computing room of claim 1, wherein, the integrated central processing device is connected with a management module for operation energy consumption through signals, and parameters of the management module for operation energy consumption are controlled to be displayed through the integrated central processing device.

3. The intelligent control method of HVAC computing room of claim 1, wherein, when multiple equipment of the same kind exist, the integrated central processing device controls the start-stop operations of the equipment of the same kind according to an order of quantity and number.

4. The intelligent control method of HVAC computing room of claim 1, wherein, the equipment operate start-stop actions according to a predefined device start-stop order, via the one key type start-stop device.

5. The intelligent control method of HVAC computing room of claim 1, wherein, the equipment further comprises a main machine start-stop device, a chilled water pump start-stop device, a cooling water pump start-stop device, a cooling water pump start-stop device, a cooling tower start-stop device, a boiler start-stop device, a thermal water bump start-stop device, and a motorized valve start-stop device.

* * * * *